O. COOK.
Oyster Culture.

No. 149,921.  Patented April 21, 1874.

WITNESSES.  INVENTOR.

UNITED STATES PATENT OFFICE.

OLIVER COOK, OF DARIEN, (ROWAYTON P. O.,) CONNECTICUT.

IMPROVEMENT IN OYSTER-CULTURE.

Specification forming part of Letters Patent No. 149,921, dated April 21, 1874; application filed February 28, 1874.

*To all whom it may concern:*

Figure 1:
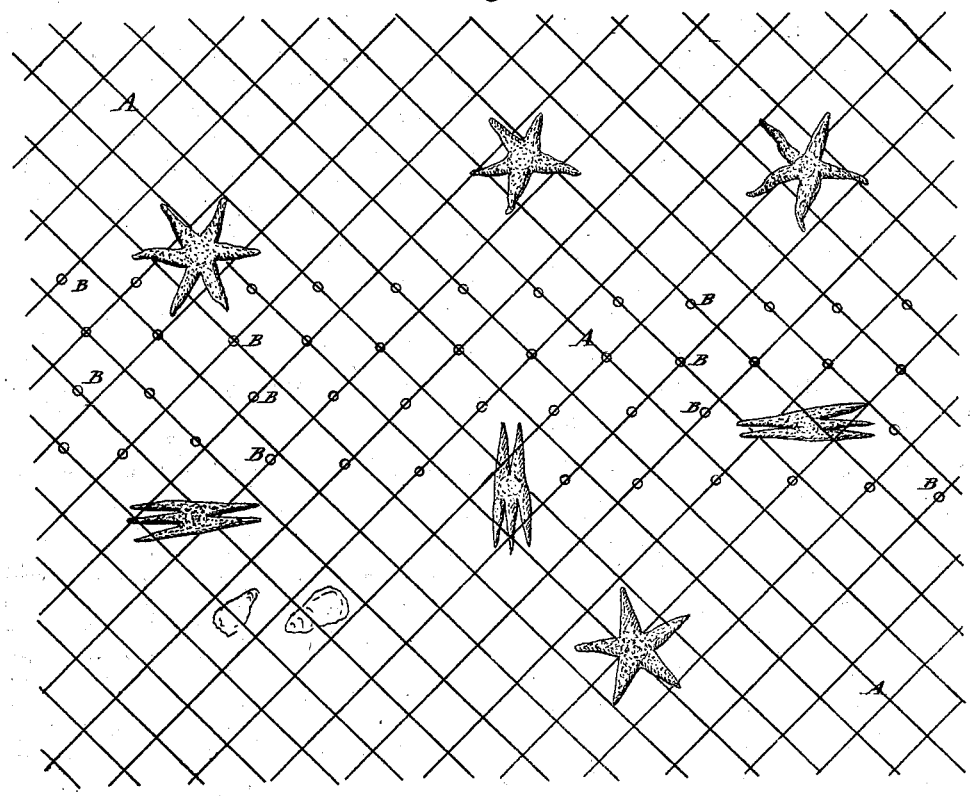
Figure 2:
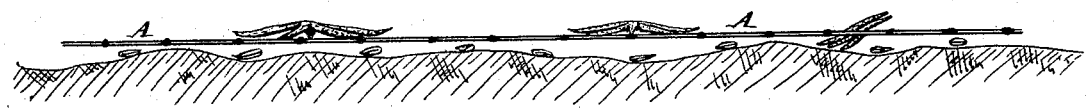

Be it known that I, OLIVER COOK, of Darien, (Rowayton P. O.,) Fairfield county and State of Connecticut, have invented a new and useful Improvement in Mode of Protecting Oyster-Beds from Star-Fish, of which the following is a specification:

Figure 1 is a view illustrating my improved mode of protecting oyster-beds from star-fish, and Fig. 2 is a section of the same.

Similar letters of reference indicate corresponding parts.

My invention has for its object, and consists in, an improved mode of protecting oyster-beds from the ravages of the star-fish, which, as is well known, annually destroys thousands of bushels of oysters, and often ruin, or nearly ruin, the beds.

A represents a net of sufficient size to cover the oyster-bed to be protected, and which is let down over said bed, and allowed to sink upon it. The sinking of the net A may be hastened by attaching sinkers B to it, as indicated in Fig. 1. When net A has sunk upon the oyster-bed, the star-fish will bring their arms or rays nearly parallel with each other, and will crawl up through the meshes of the net, and extend themselves above it, so that when the net is drawn up the star-fish will be drawn up with it, and may be destroyed.

Having thus described my invention, I claim as new and desire to secure by Letters Patent—

The mode of protecting oyster-beds from star-fish by means of a sunken net, substantially as herein set forth and described.

OLIVER COOK.

Witnesses:
JAMES T. GRAHAM,
T. B. MOSHER.